United States Patent
Martin et al.

(10) Patent No.: US 9,261,876 B2
(45) Date of Patent: Feb. 16, 2016

(54) MACHINING METHOD BY TURNING A FACE OF A SPECTACLE LENS

(75) Inventors: Guillaume Martin, Charenton-le-Pont (FR); Marc Reignault, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 769 days.

(21) Appl. No.: 13/514,156

(22) PCT Filed: Dec. 14, 2010

(86) PCT No.: PCT/FR2010/052708
§ 371 (c)(1),
(2), (4) Date: Jun. 6, 2012

(87) PCT Pub. No.: WO2011/083234
PCT Pub. Date: Jul. 14, 2011

(65) Prior Publication Data
US 2012/0240736 A1    Sep. 27, 2012

(30) Foreign Application Priority Data
Dec. 21, 2009  (FR) ...................................... 09 59328

(51) Int. Cl.
G06F 19/00    (2011.01)
G05B 19/416   (2006.01)
B24B 13/06    (2006.01)

(52) U.S. Cl.
CPC .............. *G05B 19/416* (2013.01); *B24B 13/06* (2013.01); *Y10T 82/10* (2015.01)

(58) Field of Classification Search
USPC .......... 700/174, 176, 117; 82/1.11, 118, 11.3, 82/124; 351/159.74, 159.8; 29/28, 27 C
See application file for complete search history.

(56) References Cited

U.S. PATENT DOCUMENTS

| | | | |
|---|---|---|---|
| 4,854,089 A * | 8/1989 | Morales | 451/42 |
| 6,116,734 A * | 9/2000 | Pedrono et al. | 351/159.2 |
| 6,322,946 B1 * | 11/2001 | Mahabadi et al. | 430/137.12 |
| 6,789,898 B2 * | 9/2004 | Le Saux et al. | 351/159.01 |
| 6,991,525 B2 * | 1/2006 | Diehl et al. | 451/65 |
| 7,338,163 B2 * | 3/2008 | Carimalo et al. | 351/159.42 |
| 7,427,134 B2 * | 9/2008 | Bourdoncle et al. | 351/159.42 |
| 7,739,778 B2 * | 6/2010 | Fiedler et al. | 29/27 C |
| 8,480,659 B2 * | 7/2013 | Frey et al. | 606/4 |
| 8,678,586 B2 * | 3/2014 | Mandler | 351/159.74 |
| 2006/0260447 A1 * | 11/2006 | Savoie et al. | 82/1.11 |
| 2007/0277357 A1 | 12/2007 | Meyer et al. | |
| 2010/0042079 A1 * | 2/2010 | Frey et al. | 606/4 |
| 2011/0065361 A1 * | 3/2011 | Schussler et al. | 451/11 |
| 2011/0157547 A1 * | 6/2011 | Dillon et al. | 351/177 |

FOREIGN PATENT DOCUMENTS

| | | |
|---|---|---|
| DE | 195 43 184 A1 | 3/1997 |
| EP | 1 854 585 A1 | 11/2007 |

OTHER PUBLICATIONS

International Search Report, dated May 16, 2011, from corresponding PCT application.

* cited by examiner

*Primary Examiner* — Kidest Bahta
(74) *Attorney, Agent, or Firm* — Young & Thompson (57) ABSTRACT

A machining method for machining a surface of a spectacle lens at a fixed rotation speed, includes a step of determining the rotation speed from geometric characteristics of the surface, characterized in that the step of determining the rotation speed includes the following steps: a value (Maxdiff) representative of the largest difference in geometric value of the mean sphere on the surface is determined; and the rotation speed is deduced from the value (Maxdiff) of the largest difference in geometric values of the mean sphere on the surface and from a geometric value of the cylinder (FV torus) at a predetermined far-vision control point.

19 Claims, 5 Drawing Sheets

MACHINING METHOD BY TURNING A FACE OF A SPECTACLE LENS

BACKGROUND OF THE INVENTION

1. Field of the Invention

The invention relates to machining method by turning a surface of a spectacle lens at a fixed rotational speed.

The invention also relates to a data processing system for executing a computer program implementing the machining method and the machining tool comprising this data processing system.

The invention also relates to a client-server communication interface for transferring to a remote computer a computer program implementing the machining method and its execution on said computer, or for transferring input and output data.

2. Description of the Related Art

Generally, the machining time of a surface of a spectacle lens depends on the machine used, the material and this surface.

The machining speed has an effect on the conformity of the surface produced to the surface sought. Thus, a very low speed can ensure the conformity of a very complex surface; however it will affect the productivity thereof. Conversely, a high speed allows productivity to be increased but can affect conformity.

Moreover, the optical function of a spectacle lens is provided mainly by two dioptres corresponding to the front and rear surfaces of the spectacle lens. The topography of the surface to be produced depends on the distribution of the applied function between the front surface and the rear surface of said lens. In some cases, the distribution is such that the surface to be produced is particularly complex.

Generally, it is necessary to perform tests for complex surfaces in order to determine an optimum machining speed, which is detrimental to productivity.

A need therefore exists for the simple determination of suitable machining parameters allowing both satisfactory productivity and acceptable conformity of the surface produced to the surface sought.

SUMMARY OF THE INVENTION

A first aspect of a subject of the invention is there for eamachining method by turning a surface of a spectacle lens at a fixed rotational speed, comprising a step of determining said rotational speed from geometric characteristics of said surface, said step of determining the rotational speed comprising the following steps:

determining a value representative of the greatest difference of mean sphere geometric values on said surface; and deducing the rotational speed from said value for the greatest difference of mean sphere geometric values on said surface and from a cylinder geometric value at a predetermined far-vision control point.

It will be noted that in the present document, the expression "mean sphere geometric value"Sphata point on a surface is given by the following relationship:

$$Sph = k \times \left( \frac{1}{R1} + \frac{1}{R2} \right);$$

with:

k: a constant;

R1: the maximum radius of curvature of the surface at this point;

R2: the minimum radius of curvature of the surface at this point;

Similarly, the expression "cylinder geometric value" Cylis given by the following relationship:

$$Cyl = l \times \left| \frac{1}{R1} - \frac{1}{R2} \right|;$$

with:

l: a constant;

R1: the maximum radius of curvature of the surface at this point;

R2: the minimum radius of curvature of the surface at this point.

It will be noted that in the case where the constant $$k = \frac{(n-1)}{2}$$

and the constant l=n−1, with n being the light refractive index of the material of the spectacle lens, the Sph and Cyl values would correspond to the optical definition of the mean sphere at a point of a surface and to the optical definition of the cylinder at a point of a surface.

Here, inasmuch as attention is brought to bear on the machining of the surface and there fore on its topography, independently of the optical effect resulting from the value of the refractive index, the mean sphere geometric value and the cylinder geometric value provide two concepts which, while associated with the optical properties of the surface, are independent of the material of the spectacle lens and therefore of the refractive index of the lens that will actually be manufactured.

In fact, in the method according to the invention, the rotational speed is determined independently of the material of the lens.

For convenience, it is possible to choose the value 0.265 and the value 0.53 for the constants k and l respectively. The geometric values for mean sphere and cylinder then obtained would correspond to the values for a spectacle lens having a refractive index n of 1.53, which is a common value in practice.

The method according to the invention makes it possible to determine the rotational speed in a particularly simple and convenient manner, from values obtain a bleu sing the standard calculation tools in the optical field, these calculation tools making it possible to determine the mean sphere value and the cylinder value, on the basis of a file defining the surface with a finite number of points, the coordinates for each of which being given, for example in a Cartesian frame of reference. The standard tools can there fore be used directly in the method according to the invention, by arbitrarily setting a refractive index value, for example at the above-mentioned value 1.53.

It will be noted that the greatest difference in mean sphere geometric values is a measurement representative of the greatest mean sphere gradient of the surface to be produced and that this is there fore a value that accurately represents the difficulty presented by a surface to be produced.

Taking account of the cylinder geometric value at the far-vision control point makes it possible to account for the toric component (if any), which is a further source of machining difficulty.

Thus, the method according to the invention makes it possible, by relatively simple calculations base don conventional tools for the calculation of an optical surface, to determine the rotational speed of the machining tool.

Of course, a calibration, readily performed by a reasonable number of tests, provides the basis for setting the rules for deducing the rotational speed starting from the value of the greatest difference in mean sphere geometric values and from cylinder geometric value at the far-vision control point.

The studies carried out by the inventors have furthermore surprisingly revealed that such calibration can be expressed in the form of a relatively simple look-up table, as explained hereinafter.

According to an example of implementation of the invention, the step of deducing the rotational speed comprises the following steps:
deducing a level of intrinsic difficulty of said surface from the value of the greatest difference in mean sphere geometric values and from cylinder geometric value, and
selecting the rotational speed starting from said level of difficulty and parameters pertaining to the turning machine used.

According to an example of implementation of the invention, said level of intrinsic difficulty of the surface is chosen from several predetermined levels of intrinsic difficulty as a function of predetermined ranges of cylinder geometric values and predetermined ranges of values of greatest difference in mean sphere geometric values.

Thus, the levels of difficulty look-up table can advantageously comprises a predetermined limited number of levels of difficulty values.

According to an example of implementation of the invention, the step of determining the representative value of the greatest difference in mean sphere geometric values comprises the step of processing the geometric characteristics of said surface taking account of the individual points of this surface and taking account the whole of said individual points.

This first manner of processing the coordinates file is interesting when relatively powerful calculation means are available.

According to an example of implementation of the invention, the step of determining the value representative of the greatest difference in mean sphere geometric values comprises the step of processing the geometric characteristics of said surface taking account of the individual surface portions formed by a set of contiguous points.

This second manner of processing the coordinates file is interesting when the calculation means are moderately powerful, as is the case for example of the on-board microprocessors of machining tools. Indeed, it is then useful to work on individual surface portions formed by a set of contiguous points.

According to an example of implementation of the invention, the step of determining the value representative of the greatest difference in mean sphere geometric value comprises the step of processing the geometric characteristics of said surface taking account of the surface portions that have circular contours, and in that the step of processing the geometric characteristics comprises the following steps:
determining from the points contained in each of said surface portions, the best torus that approximates to this surface portion, and
deducing therefrom the mean sphere geometric value over the whole of this circular contour surface portion.

If necessary, instead of taking the individual points of the coordinates file, circular contour surface portions are used.

In this case, the best torus that approximates to each of the surface portions is determined by well known methods based on Zernike polynomials.

According to an example of implementation of the invention, the step of determining the value representative of the greatest difference in mean sphere geometric values comprises the step of processing the geometric characteristics of said surface taking account of only a part of the surface which is known to contain the greatest geometric mean sphere gradient.

Indeed, with respect to processing only one part of the surface, it is known, when a progressive lens is concerned, that the power variations are moderate at the periphery and at the centre of the spectacle lens. As a result, in such a lens, the greatest mean sphere geometric gradient value will be found in an intermediate annular zone (neither at the centre nor the periphery); it is therefore sufficient to process this intermediate annular zone.

Preferably, the part of the surface is situated in an intermediate annular zone, between the periphery and the centre of the surface.

According to an example of implementation of the invention, the step of determining the value of greatest difference in mean sphere geometric values on said surface comprises the following steps:
calculating the mean sphere geometric values on the surface,
determining the maximum and minimum mean sphere geometric values,
determining the mean sphere geometric values on each side of the maximum and minimum mean sphere geometric values that have a predetermined angular offset with respect to the latter,
comparing the maximum and minimum mean sphere geometric values with the angularly offset mean sphere geometric values, and
determining the value of greatest difference in the mean sphere geometric values on said surface.

According to an example of implementation of the invention, the method comprises at least one of the following additional steps:
deducing a feed rate of the machining tool starting from the rotational speed and from the material of said spectacle lens, and
deducing a depth of cut of a tool of the machining machine from the rotational speed and from the material of said spectacle lens.

A subject of the invention is also, according to a second aspect, a data processing system comprising a microprocessor capable of executing a computer program for implementing the method described above.

A subject of the invention is also, according to a third aspect, a turning machine for producing a surface of a spectacle lens at a fixed rotational speed comprising the data processing system described above.

Finally, a subject of the invention, according to a fourth aspect, is a client-server communication interface comprising means capable of transferring the rotational speed determined by a computer program in order to implement the method as described above, when this computer program is executed in a data processing system.

BRIEF DESCRIPTION OF THE DRAWING FIGURES

Disclosure of the invention will now be continued via the description of an embodiment, given hereinafter non-limitatively by way of illustration with reference to the attached drawings in which.

DETAILED DESCRIPTION OF THE INVENTION

Figure 1:
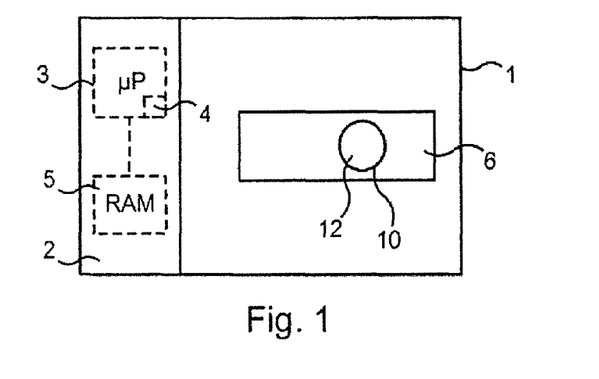
FIG. 1 diagrammatically shows a machining tool by "free form" turning implementing a machining method by turning a face of a spectacle lens according to the invention.

FIG. 1 shows a numerical-control "free-form" turning machine 1, numerical control denoting the set of equipment and software the function of which is to give movement instructions to all the elements of the turning machine 1.

For example, such a machine is described in American Patent Application U.S. 2007/0277357 A1.

This machine 1 is capable of machining a surface 12 of a spectacle lens 10, including a surface of a progressive lens.

To this end, the machine 1 comprises a data processing system 2 comprising a microprocessor 3 having a memory 4, in particular a non-volatile memory, allowing it to load and store software, in other words a computer program, which when it is executed in the microprocessor 3, allows the implementation of a machining method according to the invention.

This non-volatile memory 4 is for example of the ROM ("read only memory") type.

The system 2 further comprises a memory 5, in particular a volatile memory, allowing data to be stored during the execution of the software and the implementation of the method.

This volatile memory 5 is for example of the RAM or EEPROM type (respectively "random access memory" and "electrically erasable programmable read only memory").

The machine 1 further comprises a glazed aperture 6 suitable for allowing the surface 12 of the lens 10 on which the machine 1 is operating to be viewed.

This glazed aperture 6 makes it possible, during the implementation of the method, for a user of the machine 1 to monitor the satisfactory progress of the method by viewing the lens 10 in the machine 1.

For machining the lens 10, certain machining parameters must be known with precision, such as the rotational speed Vrot, the feed rate Vav, and the depth of cut Ppas.

These parameters Vrot, Vav and Ppas are set values given to the machine 1.

To this end, the method according to the invention comprises a step of determining each of these parameters.

The step of determining the rotational speed Vrot, the feed rate Vav, and the depth of cut Ppas according to an example of implementation of the method according to the invention will now be described with reference to FIGS. 2 to 6.

Figure 3:
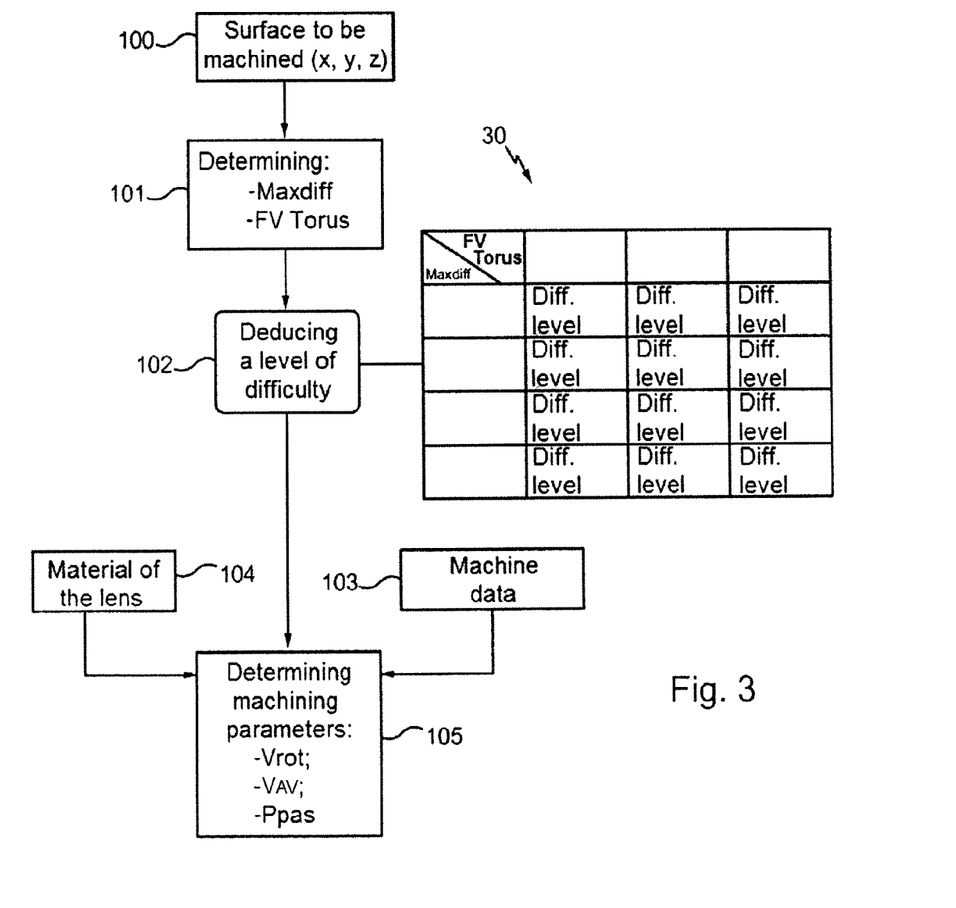
FIG. 3 is a flow chart showing different steps of operation of the method according to an example of implementation of the invention, FIG. 4 diagrammatically shows the sampled surface of a spectacle lens according to a step of the method.

FIG. 3 is a flowchart of the steps allowing the above parameters Vrot, Vav and Ppas to be determined.

The data processing system 2 is arranged in order to receive in step 100 a file comprising the geometric characteristics of the surface 12, in the form of coordinates x, y, z, for example in a Cartesian frame of reference, representative of said surface 12, in a finite number of points thereof.

Then, the system 2 characterizes the surface 12 in order to determine in step 101 a value representative of the greatest difference in mean sphere geometric values Sph on said surface 12, called Maxdiff, by sampling of this surface 12.

In the example shown, the geometric mean sphere Sph at a point of the surface 12 is expressed in dioptres and is calculated by the following relationship:

$$Sph = \left(\frac{n-1}{2}\right) \times \left(\frac{1}{R1} + \frac{1}{R2}\right);$$

with:
n: a constant equal to 1.53;
R1: the maximum radius of curvature of the surface 12 at the same point;
R2: the minimum radius of curvature of the surface 12 at the same point.

The maximum and minimum radii of curvature, respectively R1 and R2, are calculated in a known manner from the coordinates x, y, z received in step 100, in a Cartesian frame of reference, at any point of the surface 12.

The method for determining the value Maxdiff will be described below with reference to FIGS. 4 and 5.

In step 101, the system 2 further determines a cylinder geometric value of the surface 12 at a far-vision control point on the surface 12, called FV torus.

The geometric cylinder Cyl at a point of the surface 12 is expressed in dioptres and is calculated by the following relationship:

$$Cyl = (n-1) \times \left|\frac{1}{R1} - \frac{1}{R2}\right|;$$

with:
n: a constant equal to 1.53;
R1: the maximum radius of curvature of the surface 12 at the same point;
R2: the minimum radius of curvature of the surface 12 at the same point.

As above, the maximum and minimum radii of curvature, respectively R1 and R2, are calculated in a known manner from the coordinates x, y, z received in step 100, in a Cartesian frame of reference, at any point of the surface 12.

Then in step 102 the system 2 deduces a level of intrinsic difficulty of the surface 12 from the value Maxdiff of greatest difference in mean sphere geometric values Sph on the surface 12 and the FV torus cylinder geometric value of said surface 12.

Figure 2:
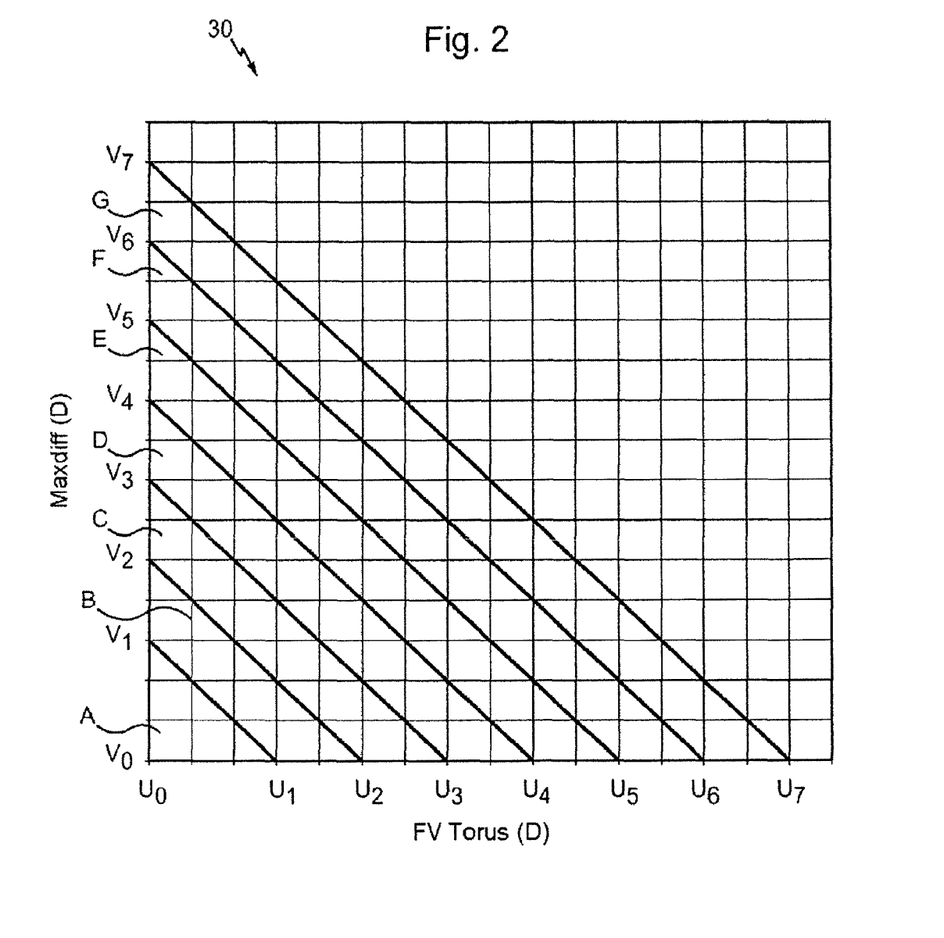
FIG. 2 shows a look-up table in graphical form, with different predetermined levels of machining difficulty.

This level of intrinsic difficulty of the surface 12 is selected from a look-up table 30 that can be seen in the form of a graph in FIG. 2 and in the form of a table in FIG. 3, previously prepared and stored in the system 2, this look-up table 30 containing a plurality of level of intrinsic difficulty values associated with different predetermined ranges for values $v_0$ to $v_7$ for Maxdiff and $u_0$ to $u_7$ for FV torus.

The values $v_0$ to $v_7$ for Maxdiff and $u_0$ to $u_7$ for FV torus are expressed in dioptres and correspond respectively to the y-axis and the x-axis of said look-up table 30.

Seven levels of difficulty are distinguished, referenced respectively from A to G, and representing an increasing level of difficulty.

The look-up table 30 comprises thresholds for levels of difficulty A to G, represented by straight lines having a negative slope, each of these straight lines corresponding to the limit between two successive levels of difficulty.

The method of preparation of the look-up table 30 will be described below with reference to FIG. 6.

In steps 103 and 104, the system 2 obtains parameters associated with the machine used 1, and the material of which the lens 10 is made, respectively.

The machine 1 is characterized by data relating to a generator that it comprises.

In step 105, the system 2 then determines the following machining parameters:
 the rotational speed Vrot from the level of difficulty A-G and the generator of the machine 1,
 the feed rate Vav from the rotational speed Vrot and the material of the lens 10, and
 the depth of cut Ppas from the rotational speed Vrot and the material of the lens 10.

In this step 105, the system 2 therefore simply and quickly obtains the above machining parameters Vrot, Vav and Ppas necessary for machining the surface 12 in order to obtain the progressive lens 10.

Thus, the machining process can continue and the machine 1 can produce said surface 12 with high precision.

Figure 4:
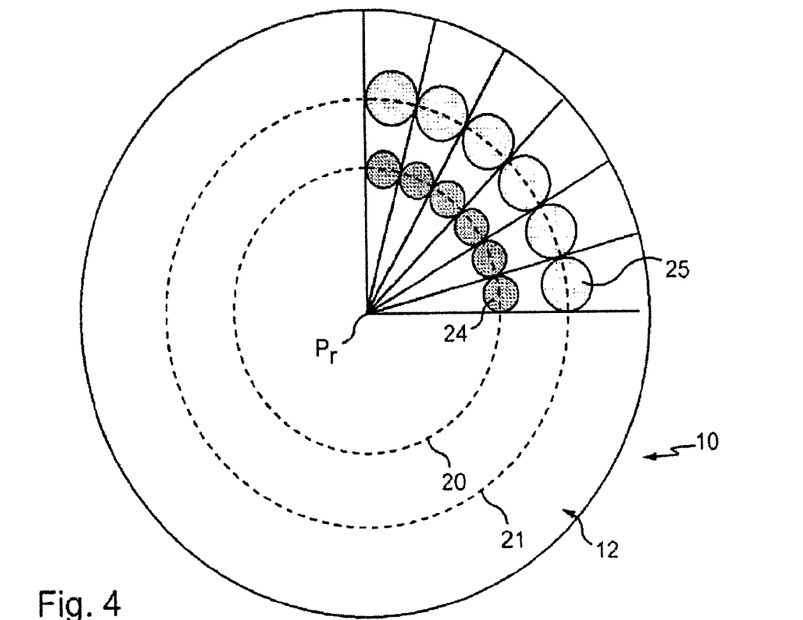

FIG. 4 shows how the system 2 chooses to process only a part of the surface 12 which is known to contain the greatest geometric mean sphere gradient.

This part of the surface 12 comprises two concentric circles 20 and 21 centred on a prism reference point Pr of the surface 12 corresponding to the centre of rotation of the spectacle lens 10 with respect to a machining axis system of the machine 1.

These two concentric circles 20 and 21 are situated between the periphery and the centre of the spectacle lens 10.

On these circles 20 and 21 circular discs 24 and 25 are shown, on which the system 2 will operate.

Each disc 24, 25 is tangential to the discs 24, 25 between which it is situated on the circle 20, 21.

The discs 24, 25 on a single circle 20, 21 have the same diameter.

For example, the circle 20 has a diameter of 17.5 mm and 24 discs of 4 mm are arranged on this circle 20 in order to conform to a sampling pitch of 15°.

The circle 21 itself has a diameter of 25 mm and 24 discs of 6 mm are arranged in this circle 21 in order to conform to the same sampling pitch.

Figure 5:
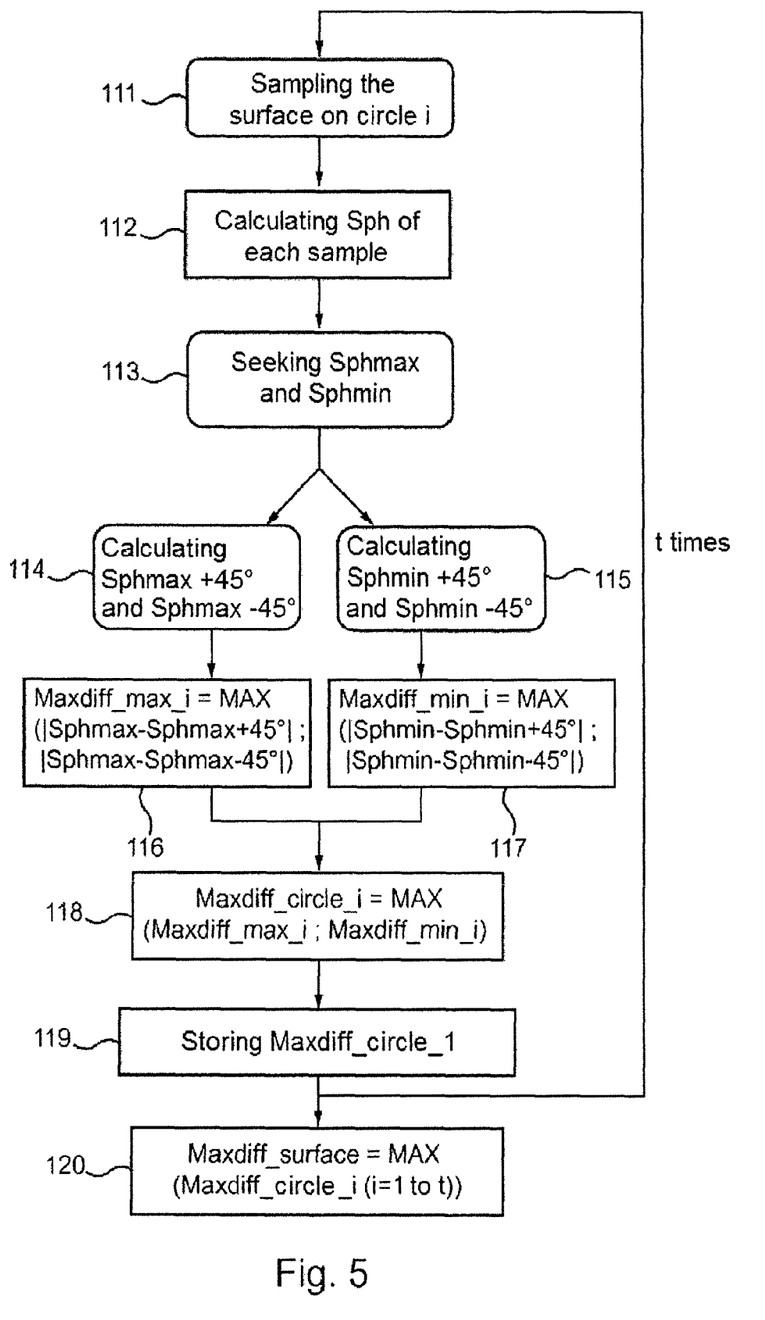
FIGS. 5 and 6 are flow charts respectively showing the step of determining the value representative of the greatest difference in mean sphere geometric values on the surface, and the steps for preparing the look-up table, and FIG. 7 diagrammatically shows a client-server communication interface comprising means adapted to transferring the rotational speed determined by the method according to the invention to a remote data processing system.

FIG. 5 is a flow chart of the steps allowing the determination of the Maxdiff value on the surface 12, for a number of circles t on the surface 12, here t=2.

In order to determine the value for Maxdiff on the surface 2, the system 2 measures the differences of the mean sphere geometric values on each of the circles 20 and 21.

To this end, in step 111 the system 2 characterizes the surface 12 by means of a first circle 20, as seen previously, so as to obtain a series of discs 24.

Each disc 24 corresponds to a scatter plot having coordinates, from which the best torus approximating to this disc 24 is deduced, by well known methods based on Zernike polynomials.

On the basis of this best torus, in step 112 the system 2 calculates the mean sphere geometric values Sph of each disc 24.

In step 113, the system 2 then searches on the circle 20 the discs 24 respectively having maximum and minimum mean sphere geometric values Sphmax and Sphmin.

In step 114, the system 2 then calculates the mean sphere geometric values Sphmax+45° and Sphmax−45° of discs 24 situated at an interval of 45° on each side of the disc 24 respectively having the maximum mean sphere geometric value Sphmax.

In parallel, in step 115, the system 2 calculates the mean sphere geometric values Sphmin+45° and Sphmin−45° of discs 24 situated at a interval of 45° on each side of the disc 24 respectively having the minimum mean sphere geometric value Sphmin.

Respectively in steps 116 and 117, the system 2 then compares the mean sphere geometric values Sphmax+45° and Sphmax−45° to the maximum mean sphere geometric value Sphmax, and the mean sphere geometric values Sphmin+45° and Sphmin−45° to the minimum mean sphere geometric value Sphmin.

In these same steps 116 and 117, the system 2 determines respectively the values for the greatest differences Maxdiff_max_1 and Maxdiff_min_1 of said mean sphere geometric values on the circle 20.

Then, in step 118, the system 2 compares the two values Maxdiff_max_1 and Maxdiff_min_1 and determines the greatest Maxdiff_circle_1 value of said two values.

This value Maxdiff_circle_1, representing the greatest difference in mean sphere geometric value on the circle 20 (called circle N°1), is stored in step 119, for example in the memory 5 of the system 2.

Then, the same steps 111 to 119 are executed for the circle 21 (called circle N°2) so as to obtain a value Maxdiff_circle_2, representing the greatest difference in mean sphere geometric values on said circle 21.

Of course, these steps are repeated t times.

Finally, in step 120, the system 2 compares the Maxdiff_circle_1 and Maxdiff_circle_2 values and determines the greatest Maxdiff surface value on the surface 12, representing the greatest difference in the mean sphere geometric values on the surface 12 to be produced by machining.

Figure 6:
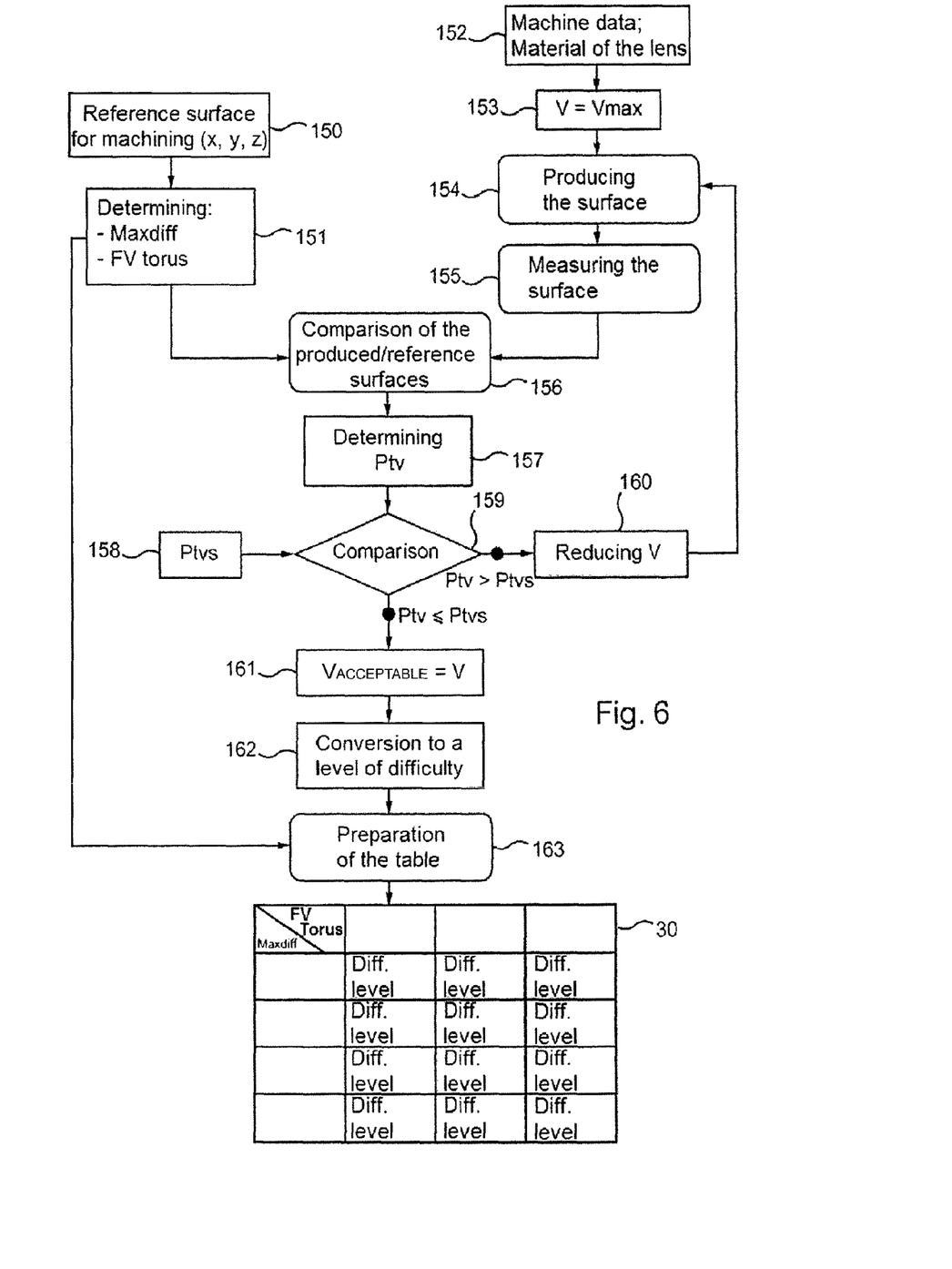

FIG. 6 is a flow chart of the steps allowing the preparation of the levels of difficulty look-up table 30, stored in the memory 4 of the system 2.

This look-up table can be built directly by the system 2 or beforehand by another data processing system and loaded in the memory 4 of the system 2.

In order to build the levels of difficulty look-up table 30, a reference surface is chosen in a step 150, and a file of coordinates x, y, z, in a Cartesian frame of reference is obtained therefrom.

The coordinates of the surface 12 make it possible to determine therefrom, in step 151, as seen previously in step 101 of the method according to the invention, geometric values for mean sphere Maxdiff and cylinder at the far-vision control point FV torus.

Ina step 152, parameters are obtained that pertain to a machining tool, in particular on the generator that it comprises and its machining ranges, as well as data on the material used for the spectacle lens 10.

Then, in step 153, the maximum speed in the speed range of the machine is chosen as the initial speed for machining the surface, said range being chosen as a function of the material of the lens.

In step 154, the machine produces the chosen reference surface.

Then, the surface produced in step 155 is measured, obtaining coordinates at any point of this surface.

Then in step 156, the comparison between the coordinates of the chosen reference surface and the coordinates of the surface produced is carried out, a comparison from which a so-called residual surface is deduced.

Said residual surface is generated by tracking errors of the turning machine 1 when it machines the surface of the progressive spectacle lens.

Thus in step 157 a "peak to valley" variance Ptv is determined, representing height variations of the residual surface.

In a step 159, the value of the determined "peak to valley" variance Ptv is then compared with a "peak to valley" variance threshold Ptvs obtained in a step 158.

If the comparison results in a Ptv value greater than the Ptvs value, the chosen speed is not within the acceptable speed range and the machining speed must be reduced in a step 160, and therefore a fresh surface must be machined, measured and compared (steps 154 to 159).

If the comparison results in a Ptv value less than the Ptvs value, the chosen speed is not within the acceptable speed range and the maximum rotational speed is deduced in a step 161.

In step 162, this maximum speed is converted into a level of difficulty, from A to G.

The Ptvs value corresponds to the threshold of passing from one level of difficulty to another.

In other words, this Ptvs value corresponds to the straight lines of equal and negative slopes, called iso-Ptv, seen previously in FIG. 2.

In a step 163, the look-up table 30 can thus be built and completed, attributing a level of difficulty to the pair formed by the Maxdiff value and the FV torus value, until a complete look-up table 30 is obtained.

Figure 7:
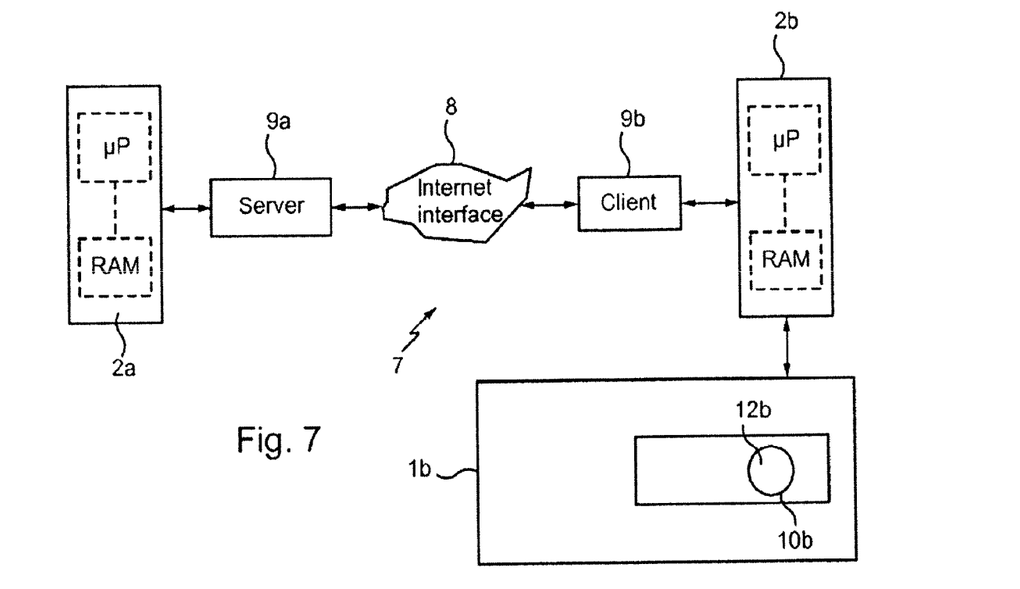

FIG. 7 shows a client-server communication interface 7 comprising a so-called supplier side 9a and another, so-called client side 9b, these two sides communicating via an internet interface 8.

The supplier side comprises a server 9a linked to a data processing system 2a of the same type as that in FIG. 1, but this time not integrated with a turning machine, this server 9a being adapted to communicate with the internet interface 8.

The client side 9b is adapted to communicate with the internet interface 8, and is linked to a data processing system 2b of the same type as that of the supplier side.

Further, the client-side data processing system 2b is linked to a turning machine 1b of the same type as that in FIG. 1 for producing a surface 12b of a progressive spectacle lens 10b.

The system 2b is adapted to receive, on the client side, a coordinates file characterizing the geometry of the surface 12b to be produced, data characterizing parameters pertaining to the turning machine 1b used, as well as data characterizing the material of the lens 10b used.

The system 2b, using the internet 8 and server 9a interface, sends this data to the supplier-side data processing system 2a for the determination of the rotational speed, the feed rate and the depth of cut.

The system 2a executes the computer program that it contains in order to implement the method according to the invention and thus deduce the machining parameters that are the rotational speed, the feed rate and the depth of cut, in order to machine the surface 12b of the lens 10b.

Using the server 9a and the internet interface 8, the system 2a sends these determined machining parameters to the client-side data processing system 2b.

This system 2b is adapted to execute software for implementing a process for machining the lens 10b, by using the parameters received, in order to produce the complex optical surface 12b on the lens 10b.

Many variants are possible according to circumstances.

For example the microprocessor can be replaced by a microcontroller.

The communication interface could allow communication via a network other than the internet.

The communication interface 8 could also make it possible to transfer the computer program in its entirety to the remote data processing system 2b in order to implement the method in the turning machine 1b.

It is noted more generally that the invention is not limited to the examples described and represented.

The invention claimed is:

1. A machining method comprising:
   determining a fixed rotational speed (Vrot) from geometric characteristics (x, y, z) of a surface (12) of a spectacle lens, according to the following steps:
   determining (102) a value (Maxdiff) representative of a greatest difference of mean sphere geometric values (Sph) on said surface (12); and
   deducing (107) the fixed rotational speed (Vrot) from said value (Maxdiff) of the greatest difference of mean sphere geometric values (Sph) on said surface (12) and from a cylinder geometric value (FV torus) at a predetermined far-vision control point; and
   turning the surface of the spectacle lens with a turning machine at the fixed rotational speed.

2. The method according to claim 1, wherein the step of deducing the rotational speed (Vrot) comprises the following steps:
   deducing (103) a level of intrinsic difficulty (A-G) at said surface (12) from the value (Maxdiff) of the greatest difference in mean sphere geometric values (Sph) and from the cylinder geometric value (FV torus), and
   selecting (107) the rotational speed (Vrot) from said level of difficulty (A-G) and parameters pertaining to the turning machine used.

3. The method according to claim 2, wherein said level of intrinsic difficulty (A-G) of the surface (12) is chosen from several levels of intrinsic difficulty (A-G) predetermined as a function of predetermined ranges of cylinder geometric values (FV torus) and predetermined ranges of values (Maxdiff) of greatest difference in mean sphere geometric values (Sph).

4. The method according to claim 1, wherein the step of determining the representative value (Maxdiff) of the greatest difference in mean sphere geometric values (Sph) comprises the step of processing the geometric characteristics (x, y, z) of said surface (12) taking account of the individual points of this surface (12), and taking account the whole of the said individual points.

5. The method according to claim 1, wherein the step of determining the value (Maxdiff) representative of the greatest difference in mean sphere geometric values (Sph) comprises the step of processing the geometric characteristics (x, y, z) of said surface (12) taking account of the individual portions (20, 21) of surface (12) formed by a set of contiguous points.

6. The method according to claim 1, wherein the step of determining the value (Maxdiff) representative of the greatest difference in mean sphere geometric values (Sph) comprises the step of processing the geometric characteristics (x, y, z) of said surface (12) taking account of the surface portions (24, 25) having circular contours, and in that the step of processing the geometric characteristics (x, y, z) comprises the following steps:

determining, starting from the points contained in each of said surface portions (24, 25), the best torus that approximates to this surface portion, and deducing there from the mean sphere geometric value over the whole of this circular contour surface portion (24, 25).

7. The method according to claim 5, wherein the step of determining the value (Maxdiff) representative of the greatest difference in mean sphere geometric values (Sph) comprises the step of processing the geometric characteristics (x, y, z) of said surface (12) taking account of only a part of the surface (12) which s known to contain the greatest mean sphere geometric gradient.

8. The method according to claim 7, wherein the part of the surface (12) is situated in an intermediate annular zone, between the periphery and the centre of the surface (12).

9. The method according to claim 1, wherein the step (102) of determining the value (Maxdiff) of greatest difference in mean sphere geometric values (Sph) on said surface (12) comprises the following steps:

calculating (113, 114) the mean sphere geometric values (Sph) on the surface (12), determining (115, 116) the maximum (Sphmax) and minimum (Sphmin) mean sphere geometric values and, determining (121-128) the mean sphere geometric values (Sphmax+45°, Sphmax−45°, Sphmin+45°, Sphmin−45°) on each side of the maximum (Sphmax) and minimum (Sphmin) mean sphere geometric values, having a predetermined angular off set with respect to the latter, comparing (129-136) the maximum (Sphmax) and minimum (Sphmin) mean sphere geometric values with the angularly-offset mean sphere geometric values (Sphmax+45°, Sphmax−45°, Sphmin+45°, Sphmin−45°), and determining (137-140) the value (Maxdiff) of greatest difference in the mean sphere geometric values (Sph) on said surface (12).

10. The method according to claim 1, it wherein the method further comprises at least one of the following additional steps:

deducing (107) a feed rate (Vav) of the machining tool (1) from the rotational speed (Vrot) and from the material of said spectacle lens (10), and deducing (107) a depth of cut (Ppas) of a tool of the machining machine (1) from the rotational speed (Vrot) and from the material of said spectacle lens (10).

11. A data processing system (2) comprising a microprocessor (3) capable of executing a computer program embodied in a non-transitory computer readable medium for implementing the method according to claim 1.

12. The method according to claim 1, wherein the turning machine for producing a surface (12) of a spectacle lens (10) at a fixed rotational speed comprising a data processing system (2) comprising a microprocessor (3) capable of executing a computer program for implementing the method according to claim 1.

13. A client-server communication interface (8) comprising means (9a, 9b) capable of transferring the rotational speed determined by a computer program embodied in a non-transitory computer readable medium in order to implement the method according to claim 1, when this computer program is executed in a data processing system (2).

14. The method according to claim 2, wherein the step of determining the representative value (Maxdiff) of the greatest difference in mean sphere geometric values (Sph) comprises the step of processing the geometric characteristics (x, y, z) of said surface (12) taking account of the individual points of this surface (12), and taking account the whole of the said individual points.

15. The method according to claim 2, wherein the step of determining the value (Maxdiff) representative of the greatest difference in mean sphere geometric values (Sph) comprises the step of processing the geometric characteristics (x, y, z) of said surface (12) taking account of the individual portions (20, 21) of surface (12) formed by a set of contiguous points.

16. The method according to claim 2, wherein the step of determining the value (Maxdiff) representative of the greatest difference in mean sphere geometric values (Sph) comprises the step of processing the geometric characteristics (x, y, z) of said surface (12) taking account of the surface portions (24, 25) having circular contours, and in that the step of processing the geometric characteristics (x, y, z) comprises the following steps:

determining, starting from the points contained in each of said surface portions (24, 25), the best torus that approximates to this surface portion, and deducing there from the mean sphere geometric value over the whole of this circular contour surface portion (24, 25).

17. The method according to claim 6, wherein the step of determining the value (Maxdiff) representative of the greatest difference in mean sphere geometric values (Sph) comprises the step of processing the geometric characteristics (x, y, z) of said surface (12) taking account of only a part of the surface (12) which s known to contain the greatest mean sphere geometric gradient.

18. The method according to claim 2, wherein the step (102) of determining the value (Maxdiff) of greatest difference in mean sphere geometric values (Sph) on said surface (12) comprises the following steps:

calculating (113, 114) the mean sphere geometric values (Sph) on the surface (12), determining (115, 116) the maximum (Sphmax) and minimum (Sphmin) mean sphere geometric values and, determining (121-128) the mean sphere geometric values (Sphmax+45°, Sphmax−45°, Sphmin+45°, Sphmin−45°) on each side of the maximum (Sphmax) and minimum (Sphmin) mean sphere geometric values, having a predetermined angular off set with respect to the latter, comparing (129-136) the maximum (Sphmax) and minimum (Sphmin) mean sphere geometric values with the angularly-offset mean sphere geometric values (Sphmax+45°, Sphmax−45°, Sphmin+45°, Sphmin−45°), and determining (137-140) the value (Maxdiff) of greatest difference in the mean sphere geometric values (Sph) on said surface (12).

19. The method according to claim 2, it wherein the method further comprises at least one of the following additional steps:

deducing (107) a feed rate (Vav) of the machining tool (1) from the rotational speed (Vrot) and from the material of said spectacle lens (10), and deducing (107) a depth of cut (Ppas) of a tool of the machining machine (1) from the rotational speed (Vrot) and from the material of said spectacle lens (10).

* * * * *